(12) United States Patent
Mercuri

(10) Patent No.: US 6,254,993 B1
(45) Date of Patent: Jul. 3, 2001

(54) FLEXIBLE GRAPHITE SHEET WITH DECREASED ANISOTROPY

(75) Inventor: Robert Angelo Mercuri, Seven Hills, OH (US)

(73) Assignee: Graftech Inc., Nashville, TN (US)

( * ) Notice: Subject to any disclaimer, the term of this patent is extended or adjusted under 35 U.S.C. 154(b) by 0 days.

(21) Appl. No.: 09/133,237

(22) Filed: Aug. 13, 1998

Related U.S. Application Data

(62) Division of application No. 08/883,386, filed on Jun. 26, 1997, now Pat. No. 5,846,459.

(51) Int. Cl.⁷ .................................................. C04B 35/52
(52) U.S. Cl. ......................... 428/408; 423/448; 423/460; 428/402
(58) Field of Search ..................... 428/372, 402, 428/408; 264/122, 321; 423/448, 460

(56) References Cited

U.S. PATENT DOCUMENTS

| | | | |
|---|---|---|---|
| 3,404,061 | 10/1968 | Shane et al. | 161/125 |
| 4,190,257 | 2/1980 | Schnitzler | 277/102 |
| 4,226,821 | 10/1980 | Ishikawa et al. | 264/134 |
| 4,642,201 | 2/1987 | Vogel | 252/503 |
| 4,826,181 | 5/1989 | Howard | 277/112 |
| 4,895,713 | 1/1990 | Greinke et al. | 423/448 |
| 4,911,972 | 3/1990 | Mercuri | 428/99 |
| 4,988,583 | 1/1991 | Watkins et al. | 429/30 |
| 5,108,849 | 4/1992 | Watkins et al. | 429/30 |
| 5,149,518 | * 9/1992 | Mercuri et al. | 423/449 |
| 5,176,863 | 1/1993 | Howard | 264/113 |
| 5,225,262 | 7/1993 | Leduc | 428/75 |
| 5,225,379 | 7/1993 | Howard | 501/99 |
| 5,228,701 | 7/1993 | Greinke et al. | 277/102 |
| 5,300,370 | 4/1994 | Washington et al. | 429/34 |
| 5,494,506 | 2/1996 | Ford et al. | 55/502 |
| 5,531,454 | 7/1996 | Borneby | 277/26 |
| 5,683,778 | 11/1997 | Crosier | 428/59 |
| 5,830,389 | * 11/1998 | Capote et al. | 252/512 |
| 5,981,072 | * 11/1999 | Mercuri et al. | 428/408 |

FOREIGN PATENT DOCUMENTS

| | | |
|---|---|---|
| 54-088911 | 7/1979 | (JP) . |
| 63-157747 | 6/1988 | (JP) . |
| 63-242395 | 10/1988 | (JP) . |
| 1123991 | 5/1989 | (JP) . |
| 8143856 | 6/1996 | (JP) . |
| 8169478 | 7/1996 | (JP) . |

OTHER PUBLICATIONS

WO 95/16287, David P. Wilkinson et al., Embossed Fluid Flow Field Plate for Electrochemical Fuel Cells, Publication Date Jun. 15, 1995.

* cited by examiner

*Primary Examiner*—Allan R. Kuhns
(74) *Attorney, Agent, or Firm*—James R. Cartiglia

(57) ABSTRACT

Flexible graphite sheet is made by compressing a mixture of relatively large particles of intercalated, exfoliated, expanded natural graphite with smaller particles of intercalated, exfoliated expanded, expanded particles of natural graphite. The resulting sheet of flexible graphite exhibits increased electrical conductivity through the thickness ("c" direction) of the sheet and improved sealability perpendicular to the "c" direction.

1 Claim, 1 Drawing Sheet

FLEXIBLE GRAPHITE SHEET WITH DECREASED ANISOTROPY

This is a divisional application of Ser. No. 08/883,386, filed Jun. 26, 1997, now U.S. Pat. No. 5,846,459.

FIELD OF THE INVENTION

This invention relates to a method of making flexible graphite sheet having reduced anisotropy, with respect to electrical resistivity, to provide increased electrical conductivity through the sheet thickness, with respect to sealability, to provide improved sealability (less leakage) perpendicular to the thickness of the flexible graphite sheet.

BACKGROUND OF THE INVETION

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties which are highly directional. Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. Natural graphites possess a high degree of orientation.

As noted above, the bonding forces holding the parallel layers of carbon atoms together are only weak van der Waals forces. Natural graphites can be treated so that the spacing between the superposed carbon layers or laminae can be appreciably opened up so as to provide a marked expansion in the direction perpendicular to the layers, that is, in the "c" direction and thus form an expanded or intumesced graphite structure in which the laminar character is substantially retained.

Natural graphite flake which has been greatly expanded and more particularly expanded so as to have a final thickness or "c" direction dimension which is at least 80 or more times the original "c" direction dimension can be formed without the use of a binder into cohesive or integrated sheets, e.g. webs, papers, strips, tapes, or the like. The formation of graphite particles which have been expanded to have a final thickness or "c" dimension which is at least 80 times the original "c" direction dimension into integrated sheets without the use of any binding material is believed to be possible due to the excellent mechanical interlocking, or cohesion which is achieved between the voluminously expanded graphite particles.

In addition to flexibility, the sheet material, as noted above, has also been found to possess a high degree of anisotropy, e.g. with respect to electrical and thermal properties. Sheet material can be produced which has excellent flexibility, good strength and a high degree of orientation.

Briefly, the process of producing flexible, binderless graphite sheet material, e.g. web, paper, strip, tape, foil, mat, or the like, comprises compressing or compacting under a predetermined load and in the absence of a binder, expanded graphite particles which have a "c" direction dimension which is at least 80 times that of the original particles so as to form a substantially flat, flexible, integrated graphite sheet. The expanded graphite particles which generally are worm-like or vermiform in appearance, once compressed, will maintain the compression set. The density and thickness of the sheet material can be varied by controlling the degree of compression. The density of the sheet material can be within the range of from about 5 pounds per cubic foot to about 125 pounds per cubic foot. The flexible graphite sheet material exhibits an appreciable degree of anisotropy, e.g. as regards electrical resistivity, with the degree of anisotropy increasing upon roll pressing of the sheet material to increased density. In roll pressed anisotropic sheet material, the thickness, i.e. the direction perpendicular to the sheet surface comprises the "c" direction and the directions ranging along the length and width, i.e. along or parallel to the surfaces comprises the "a" directions.

DETAILED DESCRIPTION OF THE INVENTION

Figure 1:
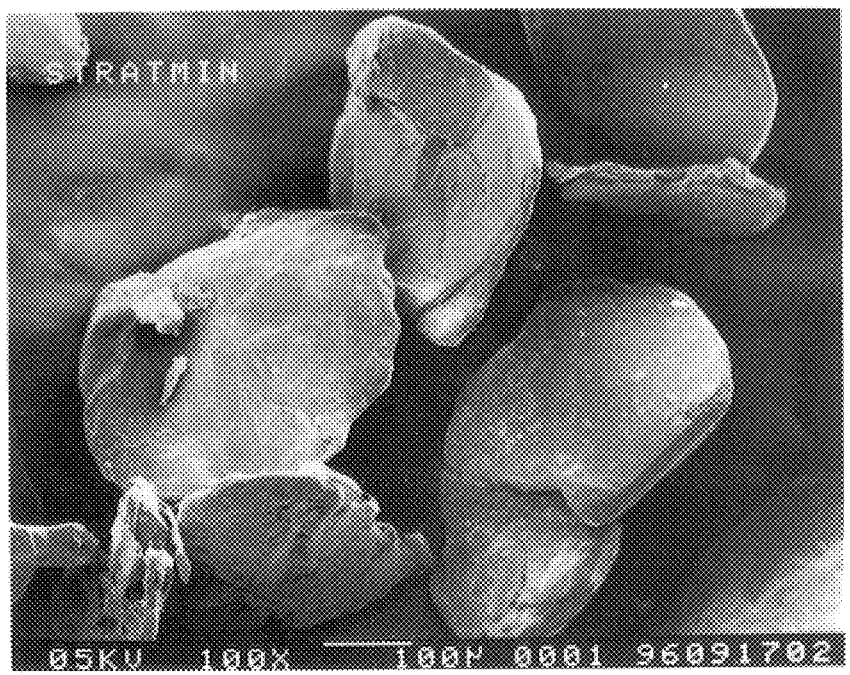
FIG. 1 is a scanning view electron microscope (SEM) at an original magnification of 100× showing natural graphite flake sized in the range of 20×50 mesh.

Graphite is a crystalline form of carbon comprising atoms bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite". Upon exposure to high temperature, the particles of intercalated graphite expand in dimension as much as 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets which, unlike the original graphite flakes, can be formed and cut into various shapes.

A common method for manufacturing graphite foil from flexible graphite is described by Shane et al in U.S. Pat. No. 3,404,061 the disclosure of which is incorporated herein by reference. In the typical practice of the Shane et al method, natural graphite flakes are intercalated by dispersing the flakes in a solution containing an oxidizing agent of, e.g. a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent.

After the flakes are intercalated, any excess solution is drained from the flakes. The quantity of intercalation solution retained on the flakes after draining may range from 20 to 150 parts of solution by weight per 100 parts by weight of graphite flakes (pph) and more typically about 50 to 120 pph. Alternatively, the quantity of the intercalation solution may be limited to between 10 to 50 parts of solution per hundred parts of graphite by weight (pph) which permits the washing step to be eliminated as taught and described in U.S. Pat. No. 4,895,713 the disclosure of which is also herein incorporated by reference. The intercalated graphite flakes are exfoliated into flexible graphite by exposing them to a flame for only a few seconds at temperature greater than 700° C., more typically 1000° C. or higher. The exfoliated graphite particles, or worms, are then compressed and subsequently roll pressed into a densely compressed flexible graphite foil sheet of desired density and thickness and substantially increased anisotropy with respect to electrical resistivity and other physical properties. Suitable exfoliation methods and methods for compressing the exfoliated graphite particles into thin foils are disclosed in the aforementioned U.S. Pat. No. 3,404,061 to Shane et al. It is conventional to compress the exfoliated worms in stages with the product of the first or early stages of compression referred to in the art as "flexible graphite mat" having a density of about 3 to 10 lbs/ft.$^3$ and a thickness of from 0.1 to 1 inch. The flexible graphite mat is then further compressed by roll pressing into a standard density sheet or foil of preselected thickness. A flexible graphite mat may be thus compressed by roll pressing into a thin sheet or foil of between 2–180 mils in thickness with a density approaching theoretical density, although a density of about 70 lbs./ft.$^3$ is acceptable for most applications and suitably 10 to 100 lbs/ft$^3$.

Figure 2:
FIG. 2 is a scanning electron microscope (SEM) view at an original magnification of 100× showing natural graphite flake sized 50×100 mesh.

In a particular embodiment of the present invention, a first batch of natural graphite flake particles, i.e. naturally occurring graphite flake, as shown in FIG. 1 (original magnification 100×), at least 80% by weight sized 20×50 mesh (through 20 mesh on 50 mesh), are treated by dispersing the naturally occurring flakes in an intercalating solution such as above-described. After the flakes of the first batch are intercalated, excess solution is drained from the flakes which are then washed with water and dried. A second batch of smaller sized natural graphite flakes as shown in FIG. 2 (original magnification 100×), sized at least 80% by weight 50 by 100 mesh (through 50 mesh on 100 mesh), is treated with an intercalating solution in the same manner as the first batch and similarly water-washed and dried. These unexfoliated intercalated natural graphite flakes, at least 80% by weight 50 by 100 mesh, are mixed and blended with the unexfoliated particles of the first batch to provide from about 25% to 75% by weight of the smaller sized unexfoliated intercalated natural graphite flake in the blended mixture. The unexfoliated intercalated natural graphite flake particles are readily mixed to provide a substantially uniform blend of unexfoliated, unexpanded flake particles. This can be achieved, for example, by spreading the finer, unexfoliated natural graphite particles over a bed of the larger unexfoliated natural graphite particles which are positioned on a vibrating table.

The mixture of dried flakes is exposed to a flame for only a few seconds and the intercalated flake particles expand, i.e. exfoliate, into vermicular, worm-like particles which are about 80 to 1000 times the volume of the initial dried intercalated flakes.

The use of more than 80% by weight of the smaller size particles has been found to result in a fragile sheet product which does not have good tensile strength; the use of amounts of the smaller sized particles of less than 25% by weight does not significantly affect the anisotropy of the resulting flexible graphite sheet as regards electrical resistivity.

The mixture of large and small exfoliated graphite particles is roll-pressed into sheet or foil typically 0.002 to 0.180 inch mm thick and having a density of at least 10 lbs./ft.$^3$. The resultant sheet, or foil, is characterized by having reduced electrical resistivity, i.e. increased electrical conductivity, across the thickness ("c" direction) of the sheet or foil. As the proportional amount of the smaller size particles (50×100 mesh) is increased, the electrical conductivity in the "c" direction of the sheet or foil is increased which is important when the sheet or foil is used as a component of a fuel cell electrode as described in U.S. Pat. No. 5,300,370 with reference to "GRAFOIL" which is the trade designation for flexible graphite products of UCAR Carbon Company Inc.

EXAMPLE I

Prior Art

Natural graphite flake, sized 80% by weight 20×50 mesh, (FIG. 1) was treated in a mixture of sulfuric (90 wt. %) and nitric acid (10 wt. %). The thus treated intercalated natural occurring flake was water washed and dried to about 1% by weight water. A portion of the treated, intercalated heat expandable natural graphite flake was introduced into a furnace at 2500° F. to obtain rapid expansion of the flake into one pound of vermicular, worm shaped particles having a volume of about 325 times that of the unexpanded intercalated flake.

The worm shaped heat expanded, intercalated graphite flake was rolled into a sheet about 0.030 inch thick and 24 inches in width and a density of 45 lbs./ft.$^3$. Samples of the 0.030 inch thick sheet had an electrical resistivity of 10,500 $\mu$m Ωm (micro ohm meters) in the direction of the thickness of the sheet ("c" direction).

EXAMPLE II

This Invention

A first batch of natural graphite flake, sized 80% by weight 20×50 mesh, (FIG. 1) was treated in a mixture of sulfuric (90 wt. %) and nitric acid (10 wt. %). The thus treated, intercalated natural graphite flake was water washed and dried to about 1% by weight water.

A second batch of smaller sized natural graphite flake, sized 80% by weight 50×100 mesh (FIG. 2) was treated in a mixture of sulfuric and nitric acid and water washed in the same manner as the first batch of larger sized natural graphite to obtain intercalated, unexpanded heat expandable natural graphite flake.

Different amounts of the intercalated, unexpanded, heat expandable natural graphite flake of the smaller particle sized second batch material was blended with one (1) pound of the intercalated, unexpanded, heat expandable natural graphite particles of the first batch to provide blended mixtures containing from about 25 to 75 by weight of the smaller sized unexpanded, intercalated natural graphite flake.

The mixture of dried flakes are exposed to a flame for only a few seconds and the intercalated flake particles expand, i.e. exfoliate, into vermicular, worm-like particles which are about 80 to 1000 times the volume of the initial dried intercalated flakes.

The mixtures of worm shaped, heat expanded, natural graphite particles were roll pressed into a sheet about 0.030 inch thick and 24 inches in width and 45 lbs/ft.$^3$.

Samples (2.5 inches diameter) of the sheet from this Example II were tested for electrical resistivity as compared to Example I, as shown in the following Table. Also, gasket-shaped samples of 80 lbs./ft.$^3$ density, in the form of rings (50 mm ID×90 mm OD, as specified in DIN 28090-1) 0.003 inch thick were tested for sealability with the results shown in the Table:

| % by Weight of Smaller (50 × 100 mesh) Starting Particles | Electrical Resistivity | Sealability (DIN 28090-1) ml/min |
|---|---|---|
| 0 | 10,500 mΩm | 0.77 |
| 25 | 5,200 mΩm | |
| 75 | 2,800 mΩm | 0.48 |

As shown above, the electrical resistivity decreases with addition of the 25%, about halved the resistivity, 75% addition had about one fourth the resistivity while substantially maintaining the handlability (strength and flexibility) necessary to utilize the material commercially. Electrical resistivity was obtained using a Keithley 2001 Multimeter and four probe gold plated platens at 225 psi pressure on the samples.

\* Mesh sizes used herein are United States screen series.

What is claimed is:

1. Flexible graphite sheet formed by compressing a blended mixture of relatively large particles of intercalated, exfoliated, expanded natural graphite at least 80% by weight sized 20×50 mesh prior to exfoliation and expansion with smaller particles of intercalated, exfoliated, expanded particles of natural graphite at least 80% by weight sized 50×100 mesh prior to exfoliation and expansion, the smaller particles being present in the amount of 25 to 75% by weight, characterized by having increased electrical conductivity through the thickness of the sheet as compared to a flexible graphite sheet formed only from relatively large particles of intercalated, exfoliated, expanded natural graphite.

\* \* \* \* \*